July 19, 1955

R. M. LANGSENKAMP 2,713,268

LIQUID SAMPLER

Filed Oct. 11, 1952

INVENTOR,
ROBERT M. LANGSENKAMP,
BY Herbert A. Minturn,
ATTORNEY.

July 19, 1955
R. M. LANGSENKAMP
2,713,268
LIQUID SAMPLER
Filed Oct. 11, 1952
2 Sheets-Sheet 2
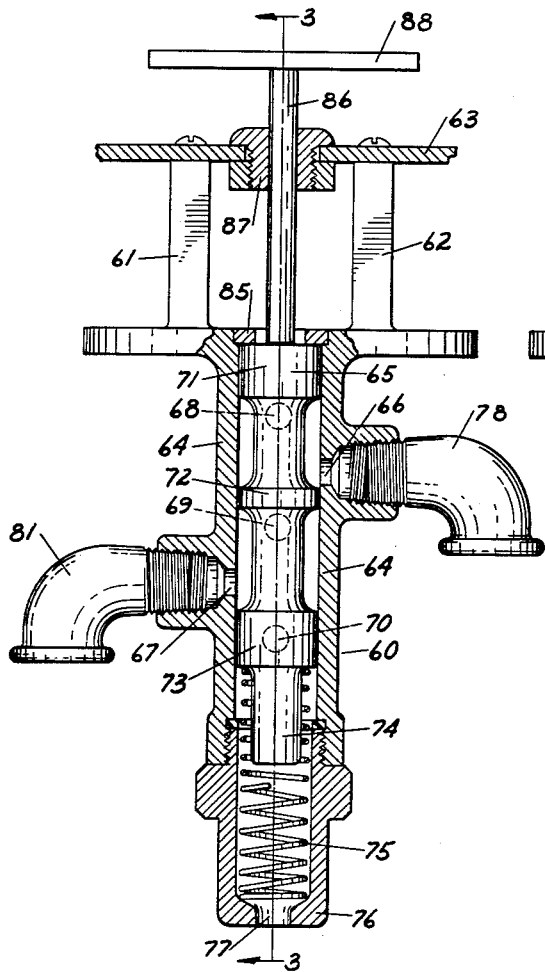
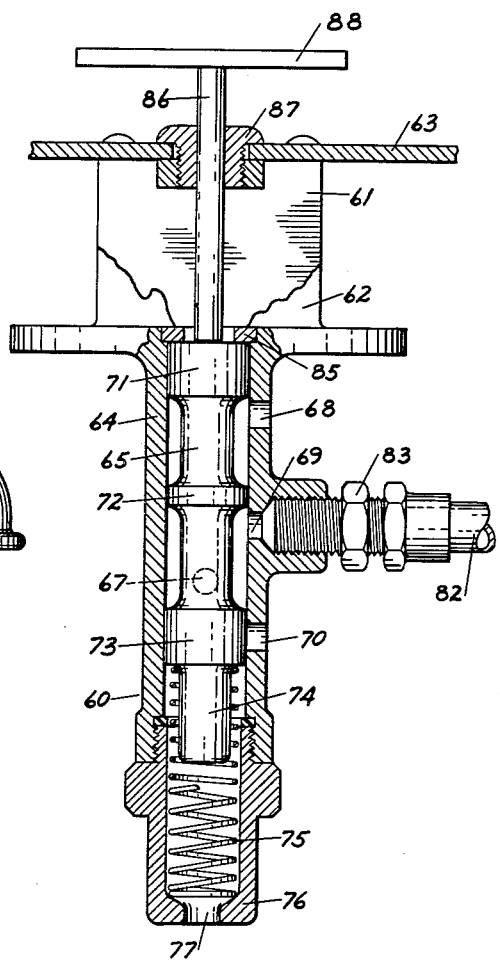
INVENTOR,
ROBERT M. LANGSENKAMP,
BY Herbert A. Minturn,
ATTORNEY.

June 19, 1955

2,713,268
LIQUID SAMPLER
Robert M. Langsenkamp, Indianapolis, Ind.
Application October 11, 1952, Serial No. 314,296
1 Claim. (Cl. 73—422)

This invention relates to a device for automatically taking samples of liquids such as milk from supplies of the liquid, measuring out the samples in exact, precise volumes, whereby identical volume samples can be taken one after another for checking and testing purposes.

This invention relates particularly to a mechanically controlled mechanism whereby the samples may be taken simply by pressing the sample receiving vessel, such as a bottle, upon a table and holding it there until the sample flows therein, and then removing the sample containing bottle.

Reference is made to the United States Letters Patent No. 2,529,397, owned by applicant's assignee, and particularly to the measuring valve, the structure of which valve is employed in the present invention.

The primary purpose of the invention is to provide an exceedingly simple yet highly accurate device for the purposes above indicated wherein there will be an entire absence of electric controls, and the actuation of the measuring valve will be controlled entirely by air or fluid flow.

These and many other objects and advantages of the invention will become apparent to those versed in the art in the following description of one particular form of the invention, as illustrated in the accompanying drawings, wherein:

Fig. 2 is a view of the control valve in central vertical section on a larger scale than that shown on Fig. 1; and Fig. 3 is a central vertical section of the control valve on the line 3—3 in Fig. 2.

Figure 1:
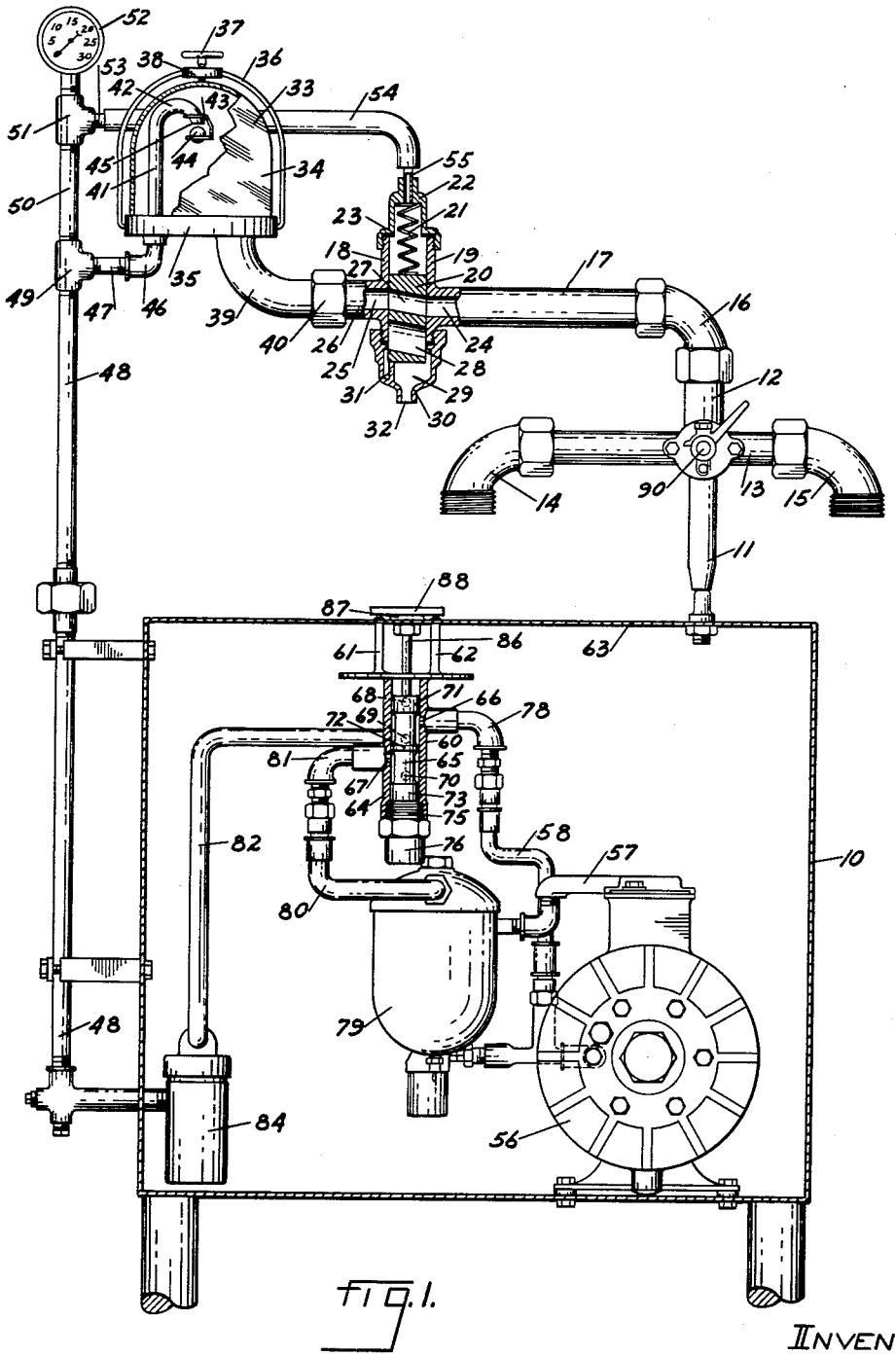
Fig. 1 is a view in vertical elevation and partial section of a device embodying the invention.

Upon a suitable base or cabinet 10 a pedestal 11 supports an intake pipe 12 which may be selectively interconnected with a plurality of sources of the liquid to be tested. In the form herein shown, the pipe 12 constitutes a T fitting 13 from the lateral ends of which extend L's 14 and 15 to which suitable piping (not shown) is attached to lead to the different sources of liquids, for example such as in a milk receiving plant where two weigh tanks are employed, and a sample is to be taken separately from each tank before it is dumped.

The pipe 12 has an L 16 detachably connected therewith and in turn connected to a horizontal run 17 of a conduit leading laterally from the side of a measuring valve 18.

The measuring valve 18 consists essentially of a vertically disposed barrel 19 within which slides a piston 20. This piston 20 has a free sliding fit so it may travel vertically within the barrel 19. The piston 20 is normally held at the lower end of travel within the barrel 19 by means of a light spring 21 abutting the upper end of the barrel cap 22 and the top end of the piston 20. The cap 22 forms an inwardly extending shoulder 23 to serve as an upper limit of travel of the piston 20.

The barrel 19 is provided with the opening 24 into the conduit 17, and is also provided with an opposite opening 25 at a slightly higher elevation, which opens into a side conduit 26.

The piston 20 is provided with two lateral passageways 27 and 28 therethrough, these passageways being inclined from the conduit 17 side upwardly to the conduit 26 side, and both passageways being on parallel axes. When the piston 20 is in its normal, down position as determined by the pressure of the spring 21, the passageway 27 serves as an interconnecting passage between the conduit 17, opening 24, opening 25, and the conduit 26, as indicated in Fig. 1. In this position of the piston 20, the passageway 28 is closed off on the left hand side, but opens by a portion of its right hand end into the chamber 29 of the lower barrel cap 30. An abutment 31 extends upwardly from the inclined floor of the cap 30, against which abutment the piston 20 rests under the pressure of the spring 21 so that fluid which may be in the passageway 28 may be discharged into the chamber 29 to flow out the lower nipple 32. When the piston 20 may be shifted to its extreme upper position to abut the shoulder 23, then the passageway 27 is closed off from both ends, and the passageway 28 registers with the openings 24 and 25 respectively, being closed off from the chamber 29.

A surge chamber generally designated by the numeral 33 is formed in the present showing out of a glass dome 34 sealably supported by a base 35, held compressively thereagainst by the wire bail 36 carrying a thumb screw 37 screw-threadedly through a member 38 secured to the bail 36 and bearing against the uppermost side of the dome 34. The bail 36 is hingedly supported by the base 35. The base 35 has an integral L 39 detachably interconnected through the union nut 40 with the conduit 26.

Within the dome 34, there is a standpipe 41 which has an upper goose neck 42 turning around and opening downwardly, and this goose neck 42 carries a wire support 43 to hold a floatable ball 44 thereon immediately under but normally spaced from the lower end 45 of the goose neck 42. When liquid rises in the dome 34 to float the ball 44, the uptravel of the ball 44 will carry it into the opening 45 to form a closure thereof, the ball 44 dropping therefrom upon lowering of the level of the fluid in the dome 34. The standpipe 41 interconnects through an L 46 and a nipple 47 with a vertically disposed pipe 48 which leads down and enters the lower part of the cabinet 10. The nipple 47 enters a T 49 from which an extension 50 leads upwardly to a T 51 to carry a pressure gage 52. The side outlet of the T 51 is provided with the nipple 53 over which is frictionally engaged a hose 54 which leads to a nipple 55 carried by the barrel cap 22.

Within the cabinet 10 there is mounted a vacuum-compressor motor driven unit 56. This is a standard unit commercially obtainable, and therefore the details of this structure are not shown nor described. It is sufficient for the purposes of describing the present invention to indicate that the unit 56 has a pressure discharge pipe 57 and a vacuum or intake pipe 58.

A control valve generally designated by the numeral 60 is mounted within the cabinet 10, to be suspended therein by the two legs 61 and 62 which are attached to the top side 63 of the cabinet 10.

The valve 60 consists essentially of the vertically disposed barrel 64 having a piston 65 reciprocable therein. The barrel 64 is provided with an upper transverse passageway 66 and a lower transverse passageway 67 centered in a common plane, and ninety degrees to that plane there are three vertically spaced apart passageways 68, 69 and 70 whose axes are parallel one with the other and within the ninety degree plane. The piston 65 is provided with three spaced apart lands, 71, 72 and 73, all of diameters such that they will have a sliding fit with the wall of the barrel 64. The piston 65 is recessed intermediate these lands so that there may be air passageway space therearound within the barrel 64. On the lower end of the piston 65 below the land 73 there is a downwardly extending pilot end 74, and a compression spring 75 freely surrounds this pilot end 74 to abut by its upper end against the land portion 73 and by its lower end against the lower end of a spring retainer cap 76. This cap 76 is provided with a lower opening 77.

The vacuum pipe of the unit 56 connects through the fitting 78 with the passageway 66. The pressure line 57 connects through a separator 79 through the pipe 80, with the fitting 81 in turn connecting with the passageway 67. A pipe 82 interconnects the passageway 69 through the fitting 83 and a moisture separator 84 with the pipe 48. The spring 75 normally retains the piston 65 in its uppermost position as indicated in the different views in the drawings, to have the upper end of the piston in abutment with a retainer ring 85.

In this uppermost position of the piston 65, the land 71 is above the opening 68 and the land 72 is below the opening 66 so that there may be a flow of air across the barrel 64 between the openings 66 and 68 and between the lands 71 and 72. Also, the land 72 is above the opening 69, and the land 73 closes off the opening 70, but it is below the opening 67 so that there may be an interflow across the barrel 64 between the openings 67 and 69. Both the openings 70 and 68 open into the atmosphere from the barrel 64.

In order to change the position of the piston 65 from that just described, a rod 86 is slidingly guided in vertical alignment through a guide 87 fixed to the top of the cabinet 63, to bear by its lower end against the top end of the piston 65. On the top end of the rod 86 there is fixed a table 88 which is the table on which the sample receiving bottle or container is to be placed.

Operation

The unit 56 is set into operation, whereupon air will be pumped through the line 57, the oil separator 79, the pipe 80, and into the barrel 64 through the opening 67 to flow around the piston 65 between the lands 72 and 73 to discharge through the opening 69. Air is taken into the unit 56 through the pipe line 58, through the opening 66, around the piston 65, between the lands 71 and 72, from the opening 68.

Thus the flow of air will be from the atmosphere through the opening 68, across the barrel 64, out the opening 66, through the unit 56, and under pressure through the pipe 57, to the separator 79, the pipe 80, fitting 81, through the opening 67 into the barrel 64, out the opening 69, into the pipe 82, through the moisture separator 84, into the pipe 48, from the upper end of which the pressure may be applied through the tubes 54 to the top of the measuring piston 20 to drive it downwardly against the pull of the spring 21 and also through the nipple 47, fitting 46, the dome 34 will be pressurized and in turn pressurize the L 39, the conduit 26, so that air will flow therefrom across the passageway 27 to the conduit 17 down through the L 16, and to the liquid intake valve 90. This valve 90 may selectively be either a two-way valve to interconnect the pipe 12 with either one of the nipples 14 or 15, or it may be a three-way valve in order to shut off the pipe 12. However, in the present description, the valve 90 will be considered to be a two-way valve. Air pressure will be discharging through either one of the nipples 14 or 15 which may be opened by the valve 90.

When a sample is to be taken, a sample vessel, such as a bottle (not shown), is placed on the table 88 and pushed downwardly to force the piston 65 downwardly against the pressure of the spring 75 so that (taking the table 88 as the abutment against the guide 87 to limit travel) the piston 65 will then be positioned to have the land 71 cover the opening 68 and the land 72 brought below the opening 69 and to have the land 73 brought below the opening 70. In this position the air under pressure entering through the opening 67 will be discharged to the atmosphere through the opening 70. Air flow out through the opening 66 will then come into the barrel 64 from the opening 69 which is the opening in communication with the pipe line 82 and in turn the pipe line 48 so that the upper end of the measuring valve barrel 19 will then be evacuated causing the piston 20 to lift, to bring the passageway 28 into registry with the openings 24 and 25. Simultaneously the dome 34 will be evacuated and in turn the entire line through the L 39, conduit 26, passageway 28, conduit 17, L 16, pipe 12, and either fitting 14 or 15 as has been selected by the valve 90. It is understood that a pipe will have been connected to the supply of liquids which is to be sampled. Thus, by evacuating those members, the atmospheric pressure will force the liquid up through the various members to flow across the passageway 28 in the piston 20 and on up into the dome 34 which serves as a surge chamber. When the operator sees the liquid coming into the chamber 34, the wall thereof being glass as above indicated, the down pressure against the table 88 is relieved to permit the container to rise while being centered under the discharge nipple 32, so that the piston 65 is again allowed to return to its uppermost position which changes the air flow to pressurize the dome 34 and also the space in the barrel 19 above the piston 20 so that the piston 20 is driven downwardly to shut off the passageway 28 from the openings 24 and 25 to carry that volume thus confined in the passageway 28 downwardly and allow it to discharge into the space 29 and out the nipple 32 into the bottle. While this is going on, the pressure in the dome 34 will force the liquid back down through the passageway 27, accelerating its return to either L 14 or 15 which may be then connected to the source of supply.

Thus by depressing and releasing the table 88, the piston 65 is controlled to reverse the evacuating and the pressurizing cycles in order to effect the sampling of the liquid.

While I have therefore shown and described my invention in the one best form as now known to me, it is obvious that structural variations may be employed without departing from the spirit of the invention, and I therefore do not desire to be limited to that precise form beyond the limitations which may be imposed by the following claim.

I claim:

A liquid sampling system comprising a sample receiving vessel supporting table; sources of hyper and hypo atmospheric air pressures; a sample valve having a chamber therein receiving and measuring liquid, the valve being shiftable in response to application thereto of said pressures; an air flow control valve having an operating member connected to said table to be shiftable therewith; means normally biasing the table to an upper position; a line conveying liquid to be tested to said sample measuring valve; separate lines interconnecting each of said pressure sources to said control valve; a line interconnecting said control valve and said sample measuring valve; said measuring valve having a sample discharge over said table; said control valve by means of said table biasing, normally interconnecting said hyper air pressure line through the control valve with said control valve-to-measuring valve line and maintaining said measuring valve by means of said hyper atmospheric pressure in a sample non-receiving and discharging condition; manual depression of the table operating the control valve closing off said hyper air pressure connection and connecting the hypo atmospheric air pressure line with said sample measuring valve, resetting the sample valve to a sample receiving and non-discharging condition and establishing connection through the sample valve with said liquid conveying line; and removal of manual pressure on said table subjecting said control valve to said table biasing action and restoring the super atmospheric pressure to said sample valve causing that valve to shift and discharge the measured liquid therein through its said discharge into a vessel on said table and be in its normal sample non-receiving condition.

References Cited in the file of this patent

UNITED STATES PATENTS

| | | |
|---|---|---|
| 2,217,855 | Bassler | Oct. 15, 1940 |
| 2,434,723 | Shook | Jan. 20, 1948 |
| 2,529,397 | Kottkamp et al. | Nov. 7, 1950 |
| 2,633,324 | Bierman | Mar. 31, 1953 |
| 2,634,086 | Johns | Apr. 7, 1953 |